United States Patent [19]
Yamazaki et al.

[11] Patent Number: 5,668,895
[45] Date of Patent: Sep. 16, 1997

[54] DIGITAL FILTER FOR IMAGE PROCESSING

[75] Inventors: Motohiro Yamazaki; Yasutoshi Morita, both of Tokyo, Japan

[73] Assignee: Nippon Precision Circuits Ltd., Tokyo, Japan

[21] Appl. No.: 621,372

[22] Filed: Mar. 25, 1996

Related U.S. Application Data

[63] Continuation of Ser. No. 427,471, Apr. 24, 1995, abandoned, which is a continuation of Ser. No. 124,082, Sep. 20, 1993, abandoned.

[30] Foreign Application Priority Data

Oct. 14, 1992 [JP] Japan .................................. 4-276002

[51] Int. Cl.$^6$ ............................................. G06K 9/40
[52] U.S. Cl. .......................... 382/260; 382/205; 382/254; 364/724.011; 364/724.16
[58] Field of Search ............................. 382/254, 260, 382/205; 364/724.01, 724.16

[56] References Cited

U.S. PATENT DOCUMENTS

| | | | |
|---|---|---|---|
| 3,818,203 | 6/1974 | Perlowski et al. | 364/715.08 |
| 4,724,544 | 2/1988 | Matsumoto | 382/54 |
| 4,760,542 | 7/1988 | Mehrgardt et al. | 364/724.01 |
| 4,847,909 | 7/1989 | Shibata | 382/54 |
| 4,887,232 | 12/1989 | Wolrich et al. | 364/715.08 |
| 5,027,423 | 6/1991 | Kawata et al. | 364/721.01 |

FOREIGN PATENT DOCUMENTS 52-109847  9/1977  Japan .................................. H03H 7/28

Primary Examiner—Jose L. Couso
Assistant Examiner—Anh Hong Do
Attorney, Agent, or Firm—Jordan and Hamburg

[57] ABSTRACT

A digital filter for image processing which permits a reduction in the size of the circuit includes a plurality of bit shifters for multiplying each picture element data of a k×k matrix, each by a coefficient which corresponds to the respective picture element. A first adder circuit adds the output data of all of the bit shifters. A first multiplier circuit multiplies picture element data of a center picture element of the k×k matrix by a predetermined coefficient. A second multiplier circuit multiplies output data of the first adder circuit by a predetermined coefficient and a second adder circuit adds output data of the first multiplier circuit and that of the second multiplier circuit.

7 Claims, 5 Drawing Sheets

DIGITAL FILTER FOR IMAGE PROCESSING

This application is a continuation of application Ser. No. 08/427,471 filed Apr. 24, 1995 abandoned, which is a continuation of Ser. No. 08/124,082 filed Sep. 20, 1993, now abandoned.

FIELD OF THE INVENTION

The present invention relates to a digital filter for image processing and more particularly to a digital filter for 2D image processing.

BACKGROUND OF THE INVENTION

FIG. 5 is a block diagram illustrating a structure of a prior art digital filter for 2D image processing. Referring now to the explanatory drawings, FIG. 4A illustrates a typical matrix-like image display and FIG. 4B illustrates an enlarged view of each picture element X11 through X33 of the 3×3 matrix shown within the large circle in FIG. 4A. The picture element data of each of the picture elements X11 through X33 is designated respectively as x11 through x33 (this designation will also be employed in the description of preferred embodiments of the invention).

FIG. 5 shows the circuit wherein a digital filtering process is carried out on the center picture element X22 in the 3×3 matrix in FIG. 4B. DLY 1 through DLY 6 denote delay circuits. Picture element data x12 and x11 are delayed respectively by 1 system clock cycle and 2 system clock cycles by the delay circuits DLY1 and DLY2, picture element data x22 and x21 are delayed respectively by 1 system clock cycle and 2 system clock cycles by the delay circuits DLY3 and DLY4 and picture element data x32 and x31 are delayed respectively by 1 system clock cycle and 2 system clock cycles by the delay circuits DLY5 and DLY6. Each of these picture element data x11 through x33 are multiplied by a coefficient that corresponds to the respective picture element by a respective multiplier MPY. An adder ADD adds each of the multiplication outputs and its addition output DOUT represents picture element data of the center picture element X22 after the digital filtering process.

Generally, the multiplier requires a large scale circuit. Consequently, the prior art example described above has a problem in that, since the multipliers MPY each require such a large scale circuit, and are required for each picture element X11 through X33, the size of the circuit of the whole system is large.

SUMMARY OF THE INVENTION

Accordingly, it is an object of the present invention to provide a digital filter for image processing which permits a reduction in the scale of the circuit.

A digital filter for image processing of the present invention comprises a plurality of bit shifters for separately multiplying picture element data by a coefficient which corresponds to the respective picture element, a first adder circuit for adding the output data of each bit shifter, a first multiplier circuit for multiplying picture element data of the center picture element by a predetermined coefficient and a second adder circuit for adding output data of the first multiplier circuit and output data of the first adder circuit. A second multiplier circuit may be provided between the first adder circuit and the second adder circuit.

These and other related objects and features of the present invention will be seen from a reading of the following description of the disclosure found in the accompanying drawings and the novelty thereof pointed out in the appended claims.

DESCRIPTION OF THE PREFERRED EMBODIMENTS

Figure 1:
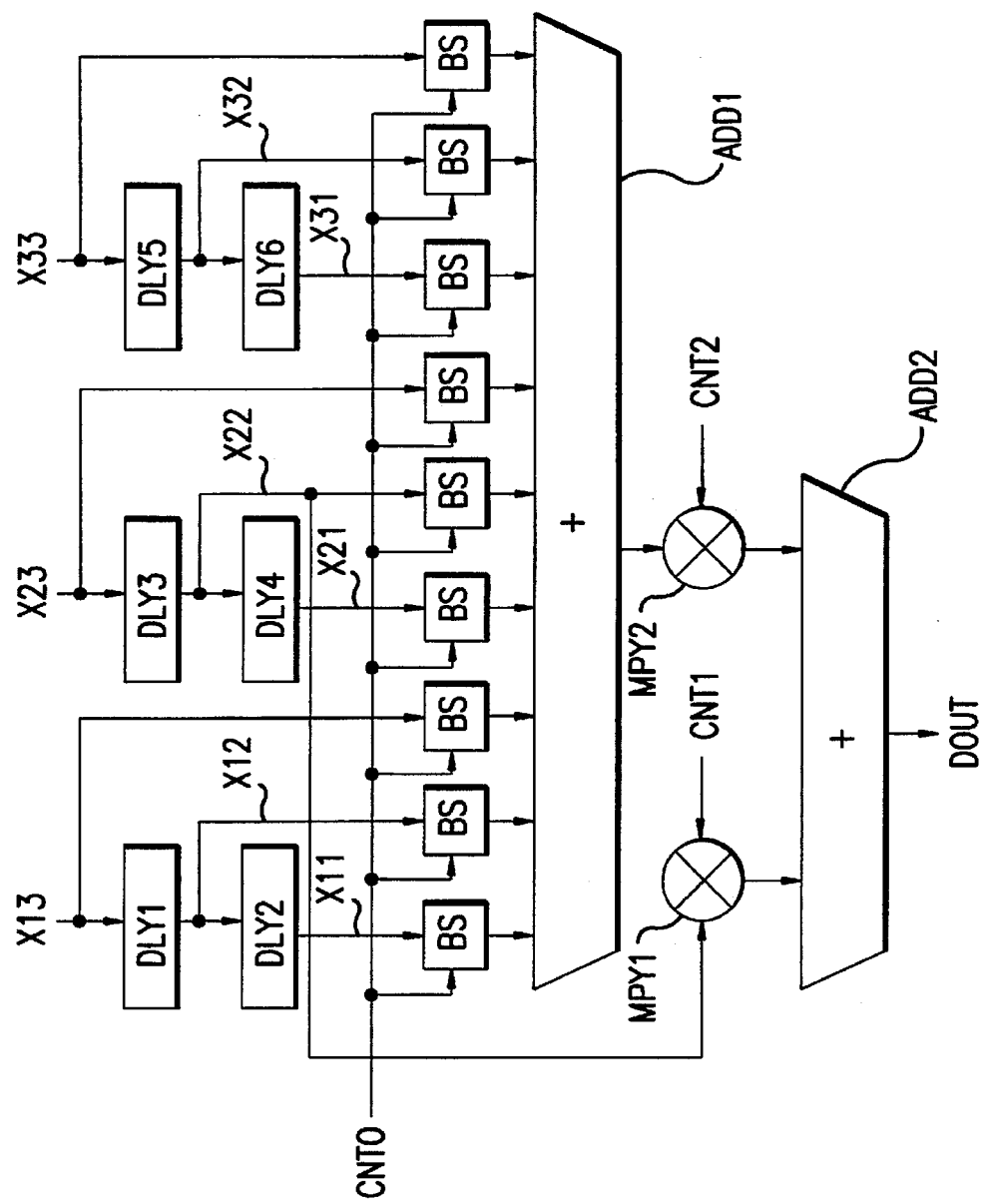
FIG. 1 is a block diagram of a digital filter for 2D image processing according to a first embodiment of the present invention.
Figure 4A:
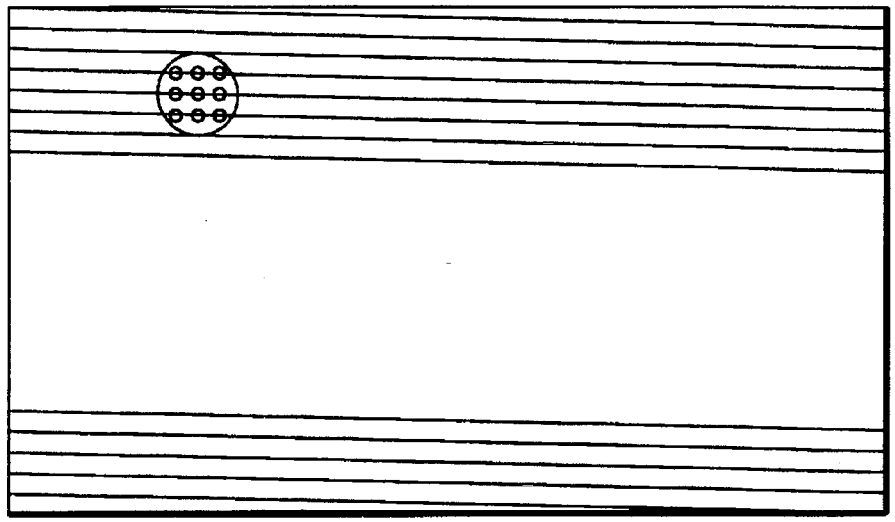
FIG. 4A is a plan view of a conventional matrix image display, showing horizontal scanning lines thereon and a 3×3 matrix of pixels which makes up part of the image display.
Figure 4B:
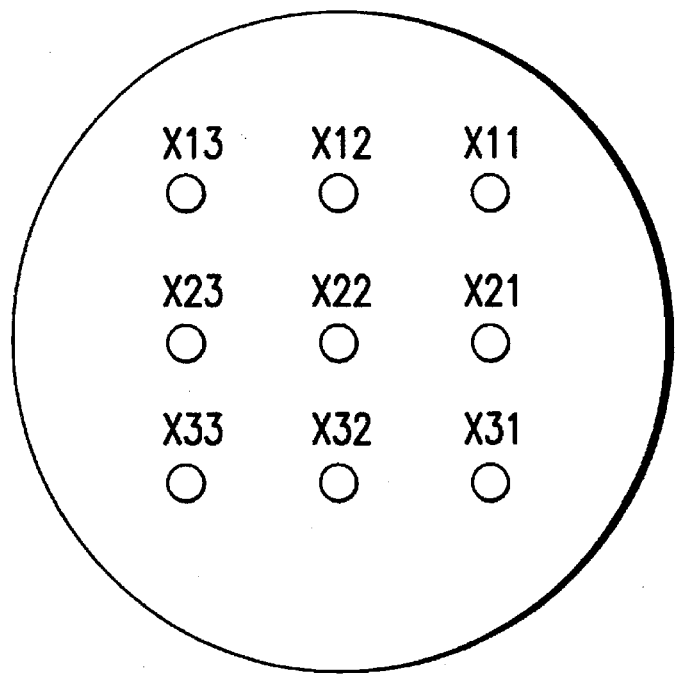
FIG. 4B is an enlarged plan view of the pixels of the 3×3 matrix of FIG. 4A.

FIG. 1 is a block diagram showing the structure of a digital filter for 2D image processing according to a first embodiment of the present invention. The explanatory drawings of FIG. 4 which have been described above will be discussed in combination with the explanation of FIG. 1.

Figure 5:
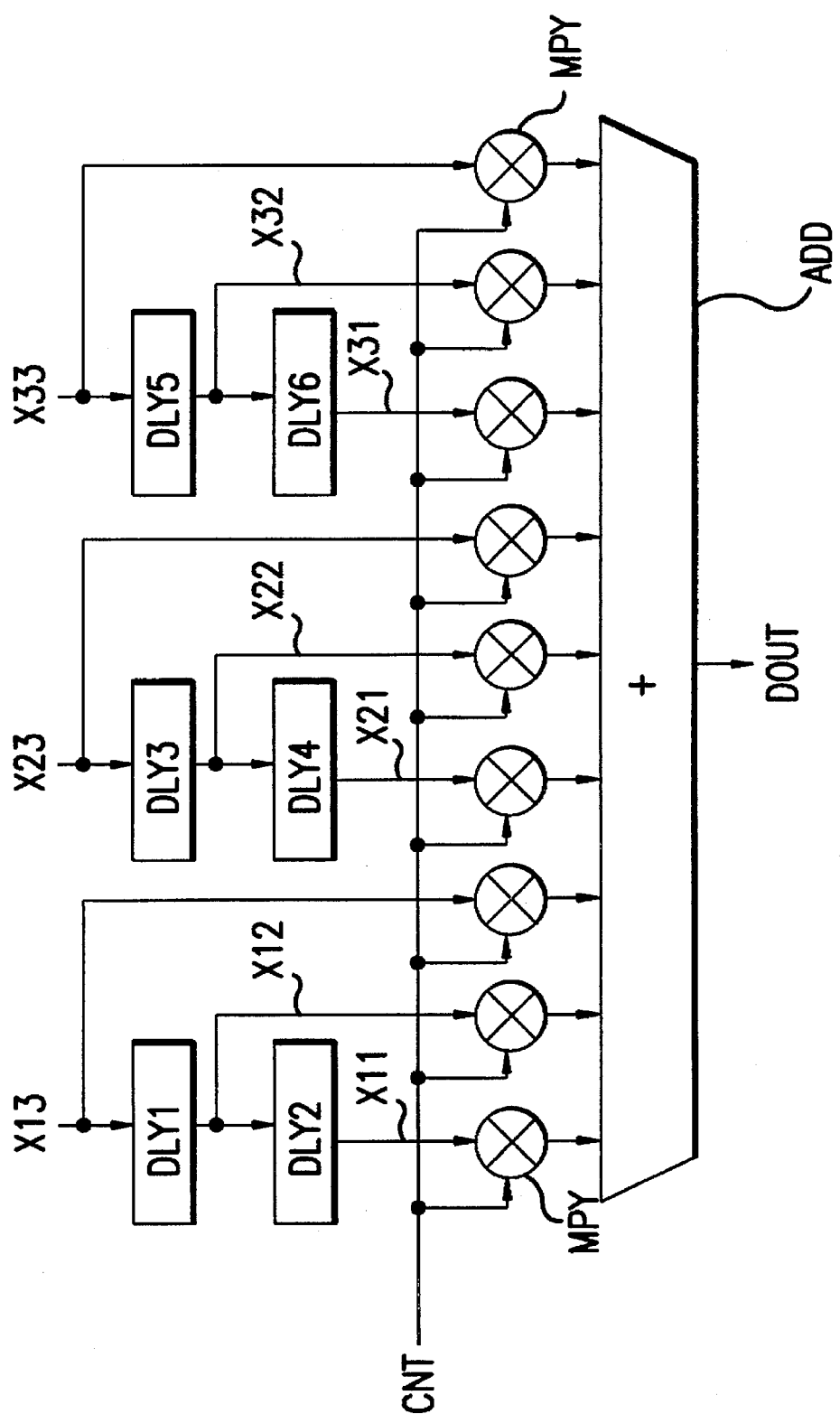
FIG. 5 is a block diagram of a prior art digital filter for processing signals with respect to the 3×3 matrix of pixels of FIG. 4B.

Delay circuits DLY 1 through DLY 6 operate in the same manner as those explained in the description of FIG. 5. Each bit shifter BS multiplies the respective picture element data x11 through x33 by a coefficient which corresponds to the respective picture element X11 through X33. That is, each picture element data is multiplied by ½ every time it is shifted by 1 bit. An adder ADD 1 adds the output data from all of the bit shifters BS. A multiplier MPY 1 multiplies picture element data x22 of the center picture element X22 of a 3×3 matrix by a predetermined coefficient (real number). A multiplier MPY 2 multiplies output data of the adder ADD 1 by a predetermined coefficient (real number). An adder ADD 2 adds output data of the multiplier MPY 1 and that of the multiplier MPY 2, and its output data DOUT represents picture element data of the center picture element X22 after the digital filtering process. In operation, the picture element data x12 and x11 are delayed respectively by 1 system clock cycle and 2 system clock cycles by the delay circuits DLY1 and DLY2, picture element data x22 and x21 are delayed respectively by 1 system clock cycle and 2 system clock cycles by the delay circuits DLY3 and DLY4 and picture element data x32 and x31 are delayed respectively by 1 system clock cycle and 2 system clock cycles by the delay circuits DLY5 and DLY6. Each of these picture element data x11 through x33 are bit shifted by a predetermined bit number by the respective bit shifters BS based on a control signal CNT 0. That is, they are each multiplied by a coefficient ($1/2^n$) which corresponds to the respective picture element X11 through X33. The output data from all of the bit shifters BS is added by the adder ADD 1. The output data from the adder ADD 1 is multiplied by a predetermined coefficient (real number) by the multiplier MPY 2 based on a control signal CNT 2. That is, because only multiplication of ($1/2^n$) can be implemented by the bit shifter BS, the multiplier MPY 2 is used to obtain a more precise value. On the other hand, the picture element data x22 of the center picture element X22 which generally becomes the most important among the picture element data x11 through x33 is multiplied by a predetermined coefficient by the multiplier MPY 1 based on a control signal CNT 1. Output data of the multiplier MPY 1 and that of the multiplier MPY 2 are added by the adder ADD 2, and the picture element data of the center picture element X22 after the digital filtering process is output as output data DOUT.

The following operations are carried out by the digital filtering process described above:

$$DOUT = A\{(1/2^{n1}) * x33 \pm (1/2^{n2}) * x32 \pm \ldots \pm (1/2^{n9}) * x11\} +$$

$$B * x22 = C1 * x33 + C2 * x32 + \ldots + C9 * x11$$

where, n1 through n9 are integers, A and B are real numbers and C1 through C9 are real numbers. That is, almost the same digital filtering process as that of FIG. 5 is carried out.

Figure 2:
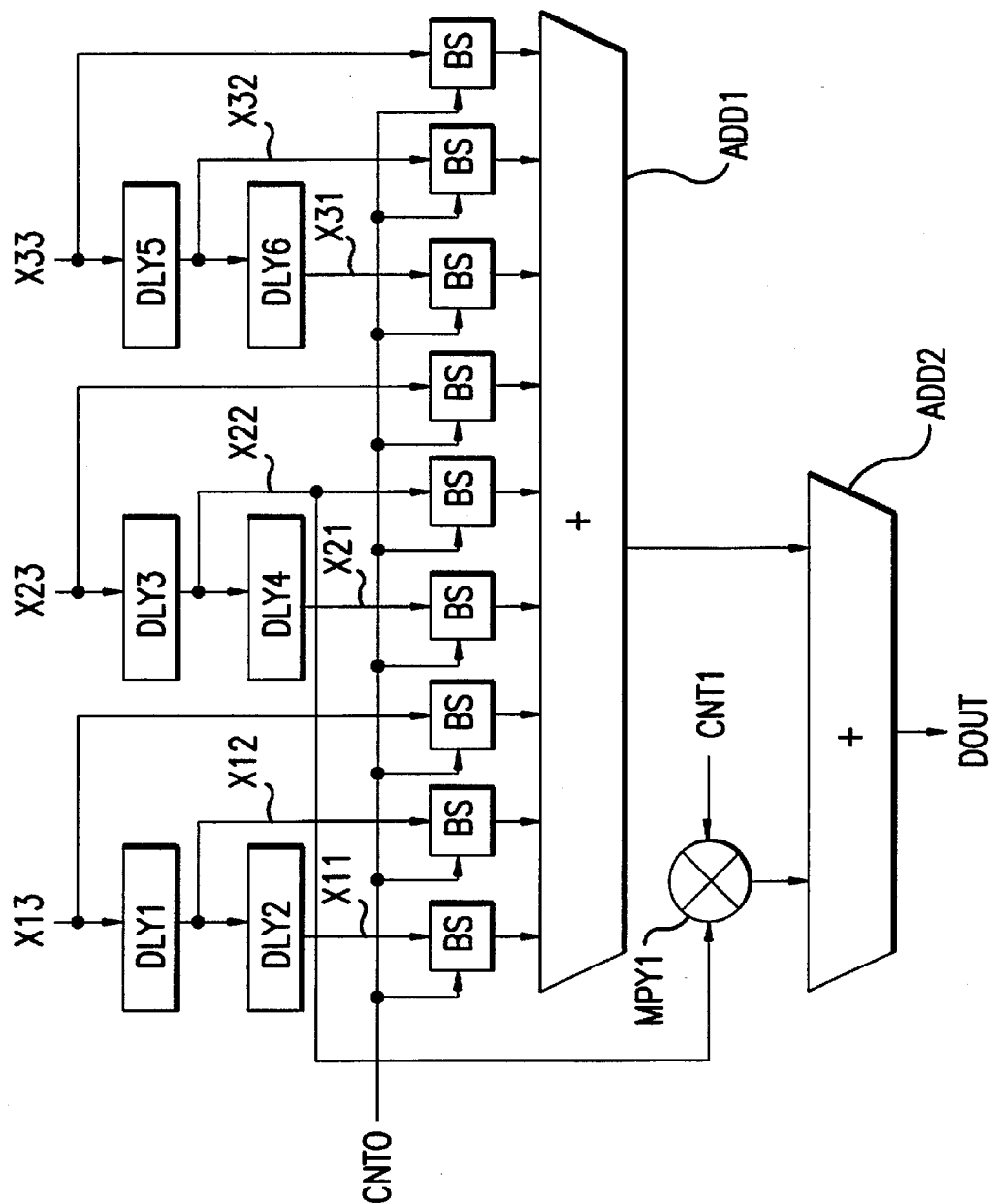
FIG. 2 is a block diagram of a digital filter for 2D image processing according to a second embodiment of the present invention.

FIG. 2 shows a second embodiment of the present invention. In this embodiment, the multiplier MPY 2 in the first embodiment shown in FIG. 1 is omitted and the output data of the adder ADD 1 is input directly to the adder ADD 2. Otherwise, the arrangement of FIG. 2 is almost the same as that of FIG. 1.

Figure 3:
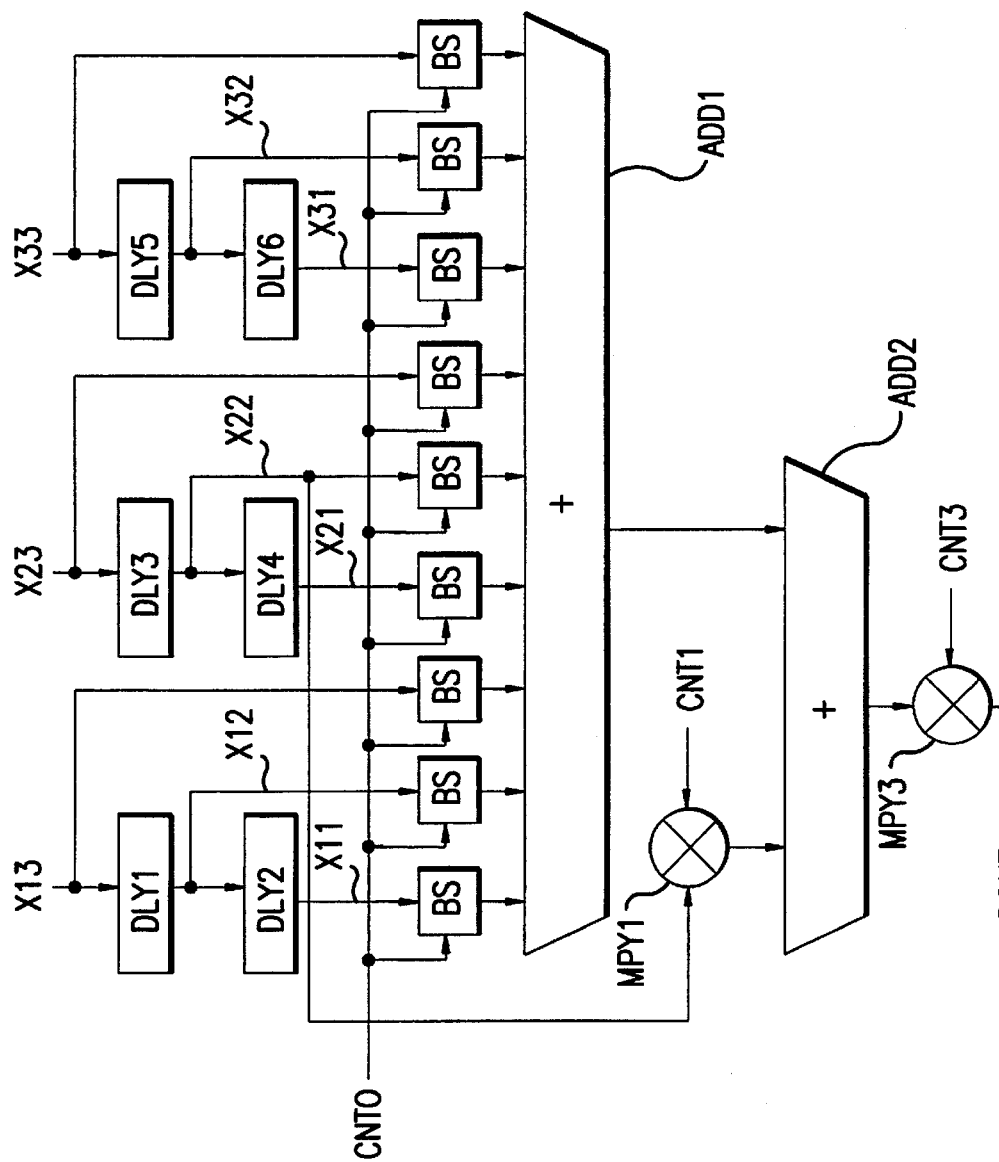
FIG. 3 is a block diagram of a digital filter for 2D image processing according to a third embodiment of the present invention.

FIG. 3 shows a third embodiment of the present invention. In this embodiment, whereas the multiplier MPY 2 of the first embodiment shown in FIG. 1 is omitted, a multiplier MPY 3 for multiplying the output data of the adder ADD 2 by a predetermined coefficient (real number) is provided. Otherwise, the arrangement of FIG. 3 is almost the same as that of FIG. 1.

Although the invention has been disclosed with reference to a 3×3 matrix in the first, second and third embodiments above, the invention may be also applied generally to a k×k matrix (k: 3, 5, 7 . . . ) such as a 5×5 matrix.

As described above, since the multiplication is carried out using bit shifters and the picture element data of the center picture element is multiplied by a predetermined real number coefficient, in accordance with the present invention it is possible to substantially reduce the scale of the circuit and at the same time to carry out the same digital filtering process as that of FIG. 5.

Although the present invention has been fully described by way of example with reference to the accompanying drawings, it is to be understood that various changes and modifications will be apparent to those skilled in the art. Therefore, unless such changes or modifications depart from the scope of the invention, they should be construed as being included therein.

What we claim is:

1. A digital filter for image processing, comprising:
   a plurality of bit shifters for separately and simultaneously multiplying each picture element data of a k×k matrix by a coefficient which corresponds to the respective element, where:

k is an odd number and k≧3, each said coefficient is only equal to $1/2^n$ where n is an integer, at least one of said coefficients is different from another of said coefficients and each of said picture element data is input into corresponding bit shifters in a parallel form;

a first adder circuit for adding output data of each of said bit shifters;

a first multiplier circuit for multiplying picture element data of a center picture element of said k×k matrix by a predetermined coefficient; and a second adder circuit for adding output data of said first multiplier circuit and that of said first adder circuit to produce output data which is picture element data of said center picture element after digital filtering by said digital filter.

2. A digital filter for image processing, comprising:
   a plurality of bit shifters for separately and simultaneously multiplying picture element data of a k×k matrix by a coefficient which corresponds to the respective element, where:

k is an odd number and k≧3, each said coefficient is only equal to $1/2^n$ where n is an integer, at least one of said coefficients is different from another of said coefficients, and each of said picture element data is input into corresponding bit shifters in a parallel form;

a first adder circuit for adding output data of each of said bit shifters;

a first multiplier circuit for multiplying picture element data of a center picture element of said k×k matrix by a predetermined coefficient;

a second multiplier circuit for multiplying output data of said first adder circuit by a predetermined coefficient other than 1; and a second adder circuit for adding output data of said first multiplier circuit and that of said second multiplier circuit to produce output data which is picture element data of said center picture element after digital filtering by said digital filter.

3. A digital filter for image processing, comprising:
   bit shifting circuit means including bit shifting circuits connected to separately and simultaneously multiply picture element data of a k×k matrix by shifting bit data of the respective picture element, where:

k is an odd number and k≧3, each said shifting bit data is only equal to $1/2^n$ where n is an integer, at least one of said shifting bit data is different from another of said shifting bit data, and each of said picture element data is input into said bit shifting circuits in a parallel form;

a first adder circuit for adding output data of each of said bit shifting circuits;

a second adder circuit which produces output data which is picture element data of a center picture element after digital filtering by said digital filter;

a first multiplier circuit connected to multiply data of said center picture element of said k×k matrix by a predetermined real number coefficient and connected to said second adder circuit to apply the multiplied center picture element data to said second adder circuit; and means, connected to said second adder circuit, for applying output data of said first adder circuit as an input to said second adder circuit.

4. A digital filter according to claim 3 wherein said means for applying output data of said first adder circuit to said second adder circuit comprises a second multiplier circuit connected to multiply the output of said first adder circuit by a real number coefficient other than 1.

5. A digital filter according to claim 3 wherein said means for applying output data of said first adder circuit to said second adder circuit comprises means for applying the output of said first adder circuit without modification to said second adder circuit.

6. A digital filter according to claim 3 further comprising a second multiplier circuit connected to multiply the output of said second adder circuit by a real number coefficient.

7. A digital filter according to claim 5 further comprising a second multiplier circuit connected to multiply the output of said second adder circuit by a real number coefficient.

* * * * *